United States Patent [19]

Rodriguez et al.

[11] Patent Number: 5,329,379
[45] Date of Patent: Jul. 12, 1994

[54] SYSTEM AND METHOD OF MEASURING FIDELITY OF DECOMPRESSED VIDEO SIGNALS AND IMAGES

[75] Inventors: Arturo A. Rodriguez, Belmont, Calif.; Mark A. Pietras, Boynton Beach, Fla.; Andres J. Saenz, Belmont, Calif.

[73] Assignee: International Business Machines Corporation, Armonk, N.Y.

[21] Appl. No.: 965,649

[22] Filed: Oct. 22, 1992

[51] Int. Cl.⁵ .............................. H04N 1/46
[52] U.S. Cl. ........................ 358/433; 358/458; 395/132
[58] Field of Search .............. 358/454, 455, 456, 457, 358/458, 462, 533, 534, 535, 538, 433, 428; 382/19, 28, 56; 395/128, 131, 132; 348/396; H04N 1/46, 1/41

[56] References Cited

U.S. PATENT DOCUMENTS

| | | |
|---|---|---|
| 4,785,349 | 11/1988 | Keith et al. |
| 4,794,455 | 12/1988 | Ericsson |
| 4,831,659 | 5/1989 | Miyaoka et al. ............ 358/433 |
| 4,893,188 | 1/1990 | Murakami et al. ........... 358/456 |
| 4,947,447 | 8/1990 | Miyaoka et al. ............ 382/56 |
| 4,951,139 | 8/1990 | Hamilton et al. |
| 5,001,560 | 3/1991 | Ericsson |
| 5,200,831 | 4/1993 | Tai ............................ 358/457 |

OTHER PUBLICATIONS

"Image Expander and Compressor", IBM Technical Disclosure Bulletin, vol. 29, No. 9, New York, U.S., Feb., 1987, pp. 4129–4133.

Arturo A. Rodriguez and O. Robert Mitchell, "Image Segmentation by Successive Background Extraction", Pattern Recognition, vol. 24, No. 5, 1991, pp. 409–420

Primary Examiner—Edward L. Coles, Sr.
Assistant Examiner—Kim Yen Vu
Attorney, Agent, or Firm—Paul W. O'Malley; Andrew J. Dillon; Bernard D. Bogdon

[57] ABSTRACT

A method of quantitatively measuring fidelity of a reproduced image reconstructed from a compressed data representation of an original image is disclosed. The method comprises, responsive to user selection, for establishing a global assessment mode or a local assessment mode. In the global assessment mode changes in luminance of the reproduced image from the original image and changes in color in first and second color difference values of the reproduced image from the original image are used score fidelity. Changes in luminance are measured using a dynamic range, nonlinear transform equation. In the local assessment mode, and responsive to user selection, the reproduced image and the original image are segmented and corresponding pairs of segments from the reproduced image and the original image are identified. Scoring of fidelity of the reproduced image to the original image is done by comparing corresponding pairs of segments in color, luminance, shape, displacement and texture.

20 Claims, 7 Drawing Sheets

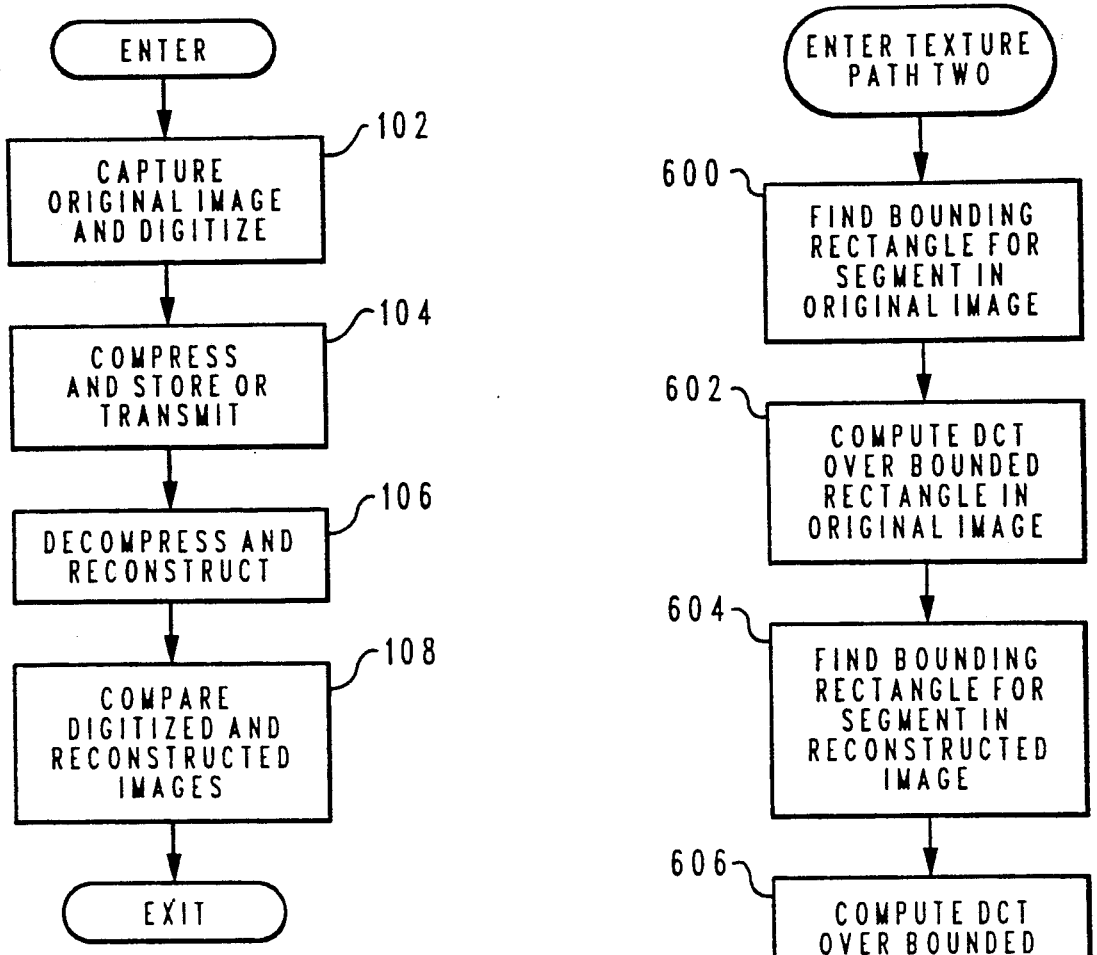
Fig. 1
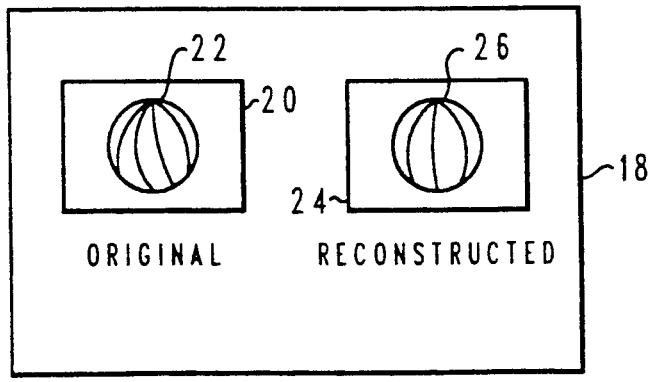
Fig. 2B
Fig. 6

SYSTEM AND METHOD OF MEASURING FIDELITY OF DECOMPRESSED VIDEO SIGNALS AND IMAGES

BACKGROUND OF THE INVENTION

1. Technical Field

The invention relates to the storage and playback of still images and video segments on a display device for a digital computer, and more particularly relates to a system and a method of measuring fidelity to an original image of an image reconstructed after compression and decompression of a digital video carrying the original image.

2. Description of the Related Art

An image is reproduced on a display device such as a color monitor for a computer by the selective assignment of color and luminance to each of a matrix of picture elements or "pixels" on the display surface of the monitor. A typical matrix of pixels may have 320 columns and 240 rows for a total of 78,800 pixels. A pixel is the minimum unit which is assigned a luminance intensity, and on color monitors, a color, for the image. Video, akin to television, may be produced on a monitor by the rapid replacement or update of image frames to simulate the appearance of motion to a human observer.

As suggested by the large number of pixels on a display surface, and the need qo assign a color and luminance intensity to each pixel to make an image, the storage and transmission of digitized video data requires large capacity storage devices and large bandwidth data transmission channels. To reduce the required storage capacity of storage devices and to reduce the required bandwidth of transmission channels, various data compression techniques are routinely applied to digitized video data.

Data compression can be based on eliminating redundant information from frame to frame in a digitized video segment, on eliminating redundant information from pixel to pixel in one frame, or by exploiting superior human perception of luminance intensity detail over color detail. The International Radio Consultative Committee (CCIR) in its Recommendation 601 called for digital coding or color images based on use of an explicit luminance intensity component (Y) and two color difference components (e.g. $C_R$ and $C_B$ for the red and blue difference signals, respectively). For compression, the coding methodology applies a four to one spatial subsampling of each of the color components. Non-overlapping two by two pixel regions of a digitized frame are encoded using an individual luminance value for each pixel and two color difference values representative of the four pixel region. The methodology results in representation of four pixels with six pieces of information, or an average of one and one half pieces per pixel. In common three color coding schemes three pieces of information have been required for each pixel. Using the technique recommended by the CCIR results in compression of up to 50%. Such a technique is called "lossy" since it does not fully preserve all of the information originally captured from a scene. The CCIR 601 Recommendation is one of several known lossy methods for the compression of video data.

Different compression techniques can exhibit superior results for given images. A preferred choice is one for which most people find the reconstructed image closest to the original image. For example one technique may work better for a high textured image while another is good for a video segment including moving objects. Objective evaluation of compression methods has been hampered by lack of scoring systems which weight features that human observers tend to notice. Most untrained human observers will look more closely at the center of a picture, rather than its edges, will respond more to changes in luminance intensity than to changes in color, and will be drawn to foreground rather than background aspects of a scene. A tunable scoring system for reconstructed images which provides tools to reflect human responses is thus a desirable development.

Previously, the root mean square pixel error between values for pixel locations given by the original and reconstructed frames was used to quantify fidelity. This approach does not account for spatial errors and context, nor does it incorporate any aspect of human perception which should ideally influence how pixel differences should be penalized.

SUMMARY OF THE INVENTION

The invention provides a system and method of quantitatively measuring fidelity of a reproduced image reconstructed from a compressed data representation of an original image. The method comprises, responsive to user selection, for establishing a global assessment mode or a local assessment mode. In the global assessment mode changes in luminance of the reproduced image from the original image and changes in color in first and second color difference values of the reproduced image from the original image are used to score fidelity. Changes in luminance are measured using a dynamic range, nonlinear transform equation. In the local assessment mode and responsive to user selection the reproduced image and the original image are segmented and corresponding pairs of segments from the reproduced image and the original image are identified. Scoring of fidelity of the reproduced image to the original image is done by comparing corresponding pairs of segments in color, luminance, shape, displacement and texture.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a high level flow chart of a process executed on a digital computer of capturing, compressing and decompressing an image;

FIG. 2B is a plan view of a display device display screen on which an original and reconstructed images are reproduced;

FIG. 6 is a flow chart of a process for scoring a segment for fidelity to texture;

DETAILED DESCRIPTION OF THE INVENTION

With reference now to the figures and particular with reference to FIG. 1, there is depicted a high level flow chart illustrating the capture, digitization, compression and reconstruction of an image (represented as steps 102, 104 and 106). Prior to decompression and reconstruction in step 106, an image may be transmitted over a transmission channel or stored in a storage device. The particulars of the compression technique are not important to the method of the invention and may in fact be unknown. The scoring of the reproduced image against the captured and digitized image occurs at step 108. Thus the method is an evaluation of the compression technique used, not one measuring the quality of the capture process for an image.

Figure 2A:
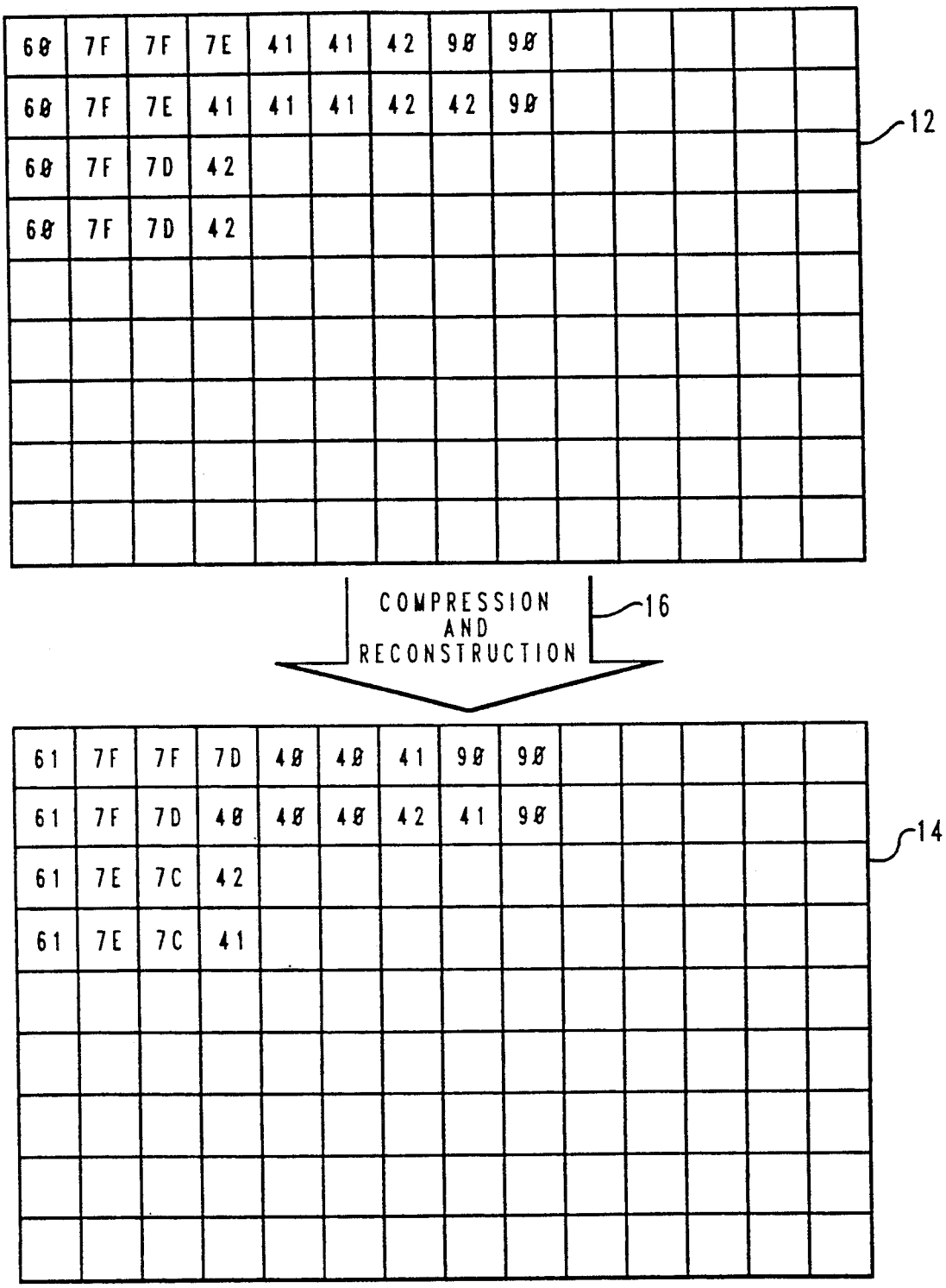
FIG. 2A is a schematic of data structures used for generating images on display devices for digital computers.

FIG. 2A illustrates an original digitized image frame 12 and a reconstructed image frame 14 produced from image frame 12 after a lossy compression process. Image frame 12 and reconstructed image frame 14 exhibit a one to one correspondence of pixel locations. A hypothetical RGB16 data format is used to illustrate representation of luminance and color for corresponding pixel locations in image frames 12 and 14. Values are hexadecimal and are shown positioned in a frame. Some values changes from frame 12 to frame 14 as function of lossy compression and decompression process 16. RGB16 is a data format utilizing two bytes (16 bits) to set red, green and blue intensity levels for a pixel. Overall luminance is derived from contribution from any of the three colors represented in the 2 byte value.

FIG. 2B illustrates a computer display screen 18 in which two windows 20 and 24 have been opened. Window 20 displays an original image of an object 22. Window 24 displays a reconstructed image developed from a compressed representation of the image of object 22. Object 26 corresponds to object 22.

Two embodiments of the invention are presented here for quantitative scoring of fidelity of a reconstructed image (D) to an original image (I). In a global assessment mode the two images are compared as a whole. In a local region assessment mode corresponding objects in the original and reconstructed images are identified and compared. The global assessment mode allows more rapid computation than the local assessment mode.

Figure 3:
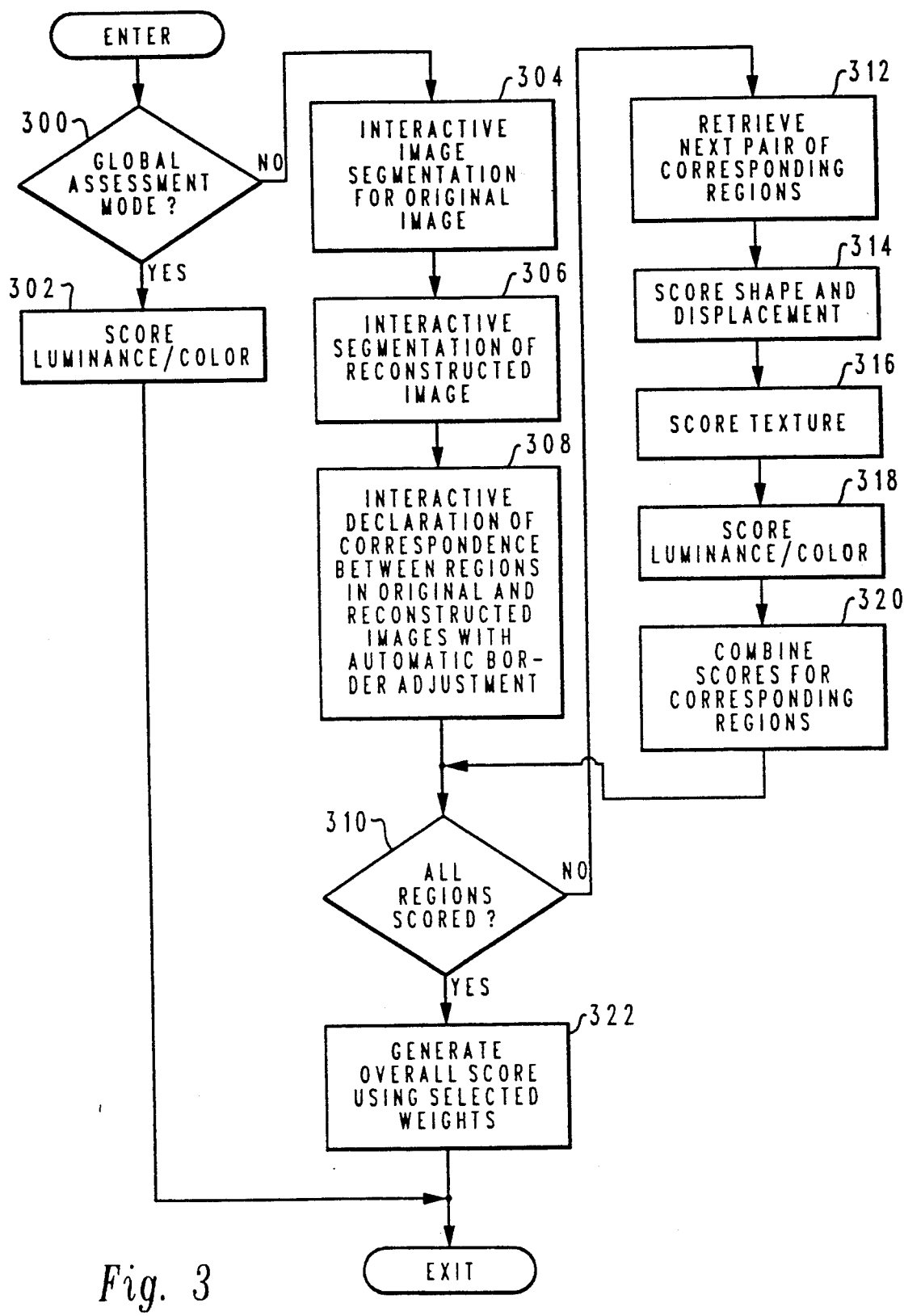
FIG. 3 is a flow chart of a process executable on a digital computer scoring the fidelity of reconstructed images to original images.
Figure 8:
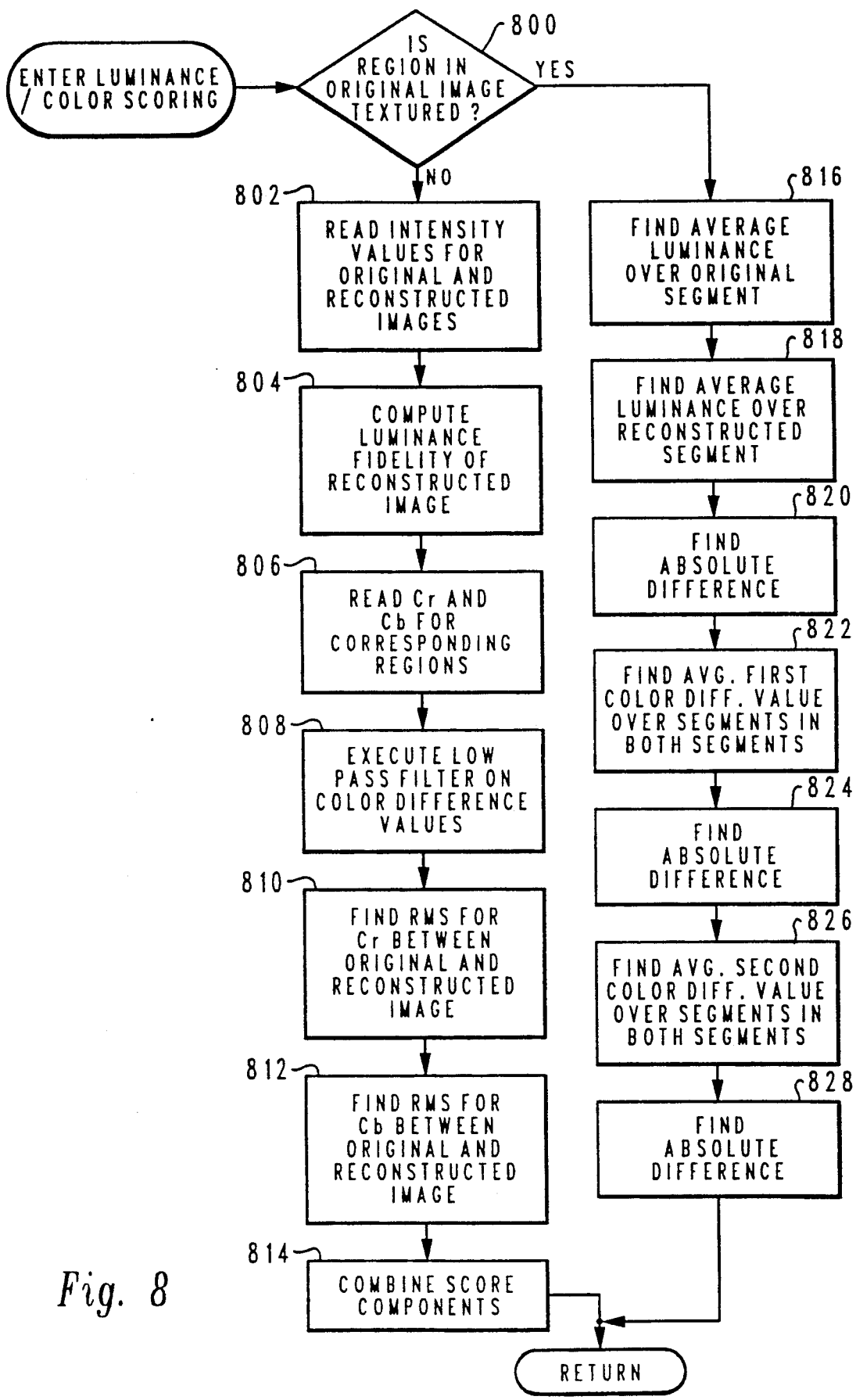
FIG. 8 is a flow chart of a process for scoring a segment or image for fidelity to color and luminance.

Determination that a user has requested a local or global assessment is illustrated in FIG. 3 by execution of step 300. The yes (Y) branch is taken upon a determination that global assessment has been requested. Step 302 represents a subroutine called to score the reconstructed frame for fidelity to an original frame by comparison of the luminance and color values pixel by pixel. The subroutine is illustrated in FIG. 8, and explained below. The score is then returned to user and the process exited.

FIG. 8 represents a process entered upon a call to score luminance and color. The scoring applied to whole images, and to nontextured regions, takes into account that human perception has less resolution to color detail than to luminance detail. The human visual system also responds in a manner analogous to a nonlinear transformation on luminance data. With execution of step 800, the process determines whether a region in an original image is textured. When the process is in the global assessment mode the region is taken to be the whole image and is defined as being nontextured. The no (N) branch is then followed and step 802 is executed to scan the original image frame and the reconstructed image frame for the dynamic luminance range of the frames and to do a nonlinear transform over the dynamic luminance range for each pixel in the frames.

The nonlinear transform used is an implementation of a logarithmic transform. One of the advantages of performing a logarithmic transformation is that multiplicative illumination changes recorded in the captured image are made additive. The implementation of the logarithmic transformation assumes that a human is likely to perceive that the luminance difference between G and 2G is the same as the luminance difference between 2G and 4G. By retaining a fraction P, of the original luminance scale resolution, a dynamic range logarithmic transformation can be expressed as:

$$L(Y) = Y_{min} + [P(Y_{max} - Y_{min} + 1) - 1] \frac{\log(Y+1) - \log(Y_{min}+1)}{\log(Y_{max}+1) - \log(Y_{min}+1)}$$

where $[Y_{min}, Y_{max}]$ is the dynamic luminance scale of the data and where P gives L(Y) a resolution equal to a fraction of the original dynamic range and thus controls how luminance differences between the original image frame and the reconstructed frame are penalized. The range is dynamic rather than fixed to avoid compression at the high intensity end and rarefaction at the low intensity end.

A potential problem posed for assessment of a reconstructed image is the presence of black video vertical or horizontal lines often found along the periphery of digitized images and video. Such lines, if not compensated for, will operate to fix the lower value of the dynamic range at zero. This results in a capricious luminance fidelity measurement. Correction of the problem may be done by disregarding an outer portion of the image or by generating a histogram of the luminance information on the original and reconstructed image frames. If the histogram exhibits a discontinuous spike at the zero luminance intensity level, it can usually be assumed that the spike represents edge lines and not part of the image. The actual $Y_{min}$ is then obtained by finding the first nonzero histogram bin of the actual distribution.

Step 804 provides accumulation over corresponding pixels of a luminance fidelity score $F_Y$. Let $Y^i(x,y)$ and $Y^d(x,y)$ be the luminance value of the pixel at pixel location (x,y) in the original and the reconstructed images respectively. Then $L(Y^i(x,y))$ and $L(Y^d(x,y))$ are the log transformed luminance values of the pixel for the two frames. Where N is the total number of pixel locations in one of the frames (i.e. the number of samples) the luminance fidelity measurement is defined as:

$$F_Y = [\Sigma 1/N(L(Y^i(x,y)) - L(Y^d(x,y)))^2]^{\frac{1}{2}}$$

where the summation is done across all pixel locations (x,y). For RGB formatted data the luminance of each pixel is calculated using the following equation:

$$Y = 0.299R + 0.587G + 0.114B.$$

Fidelity of color information is measured in steps 806, 808, 810 and 812 by first calculating two color difference components from the RGB data (step 806). Since the human has inferior color perception compared to luminance perception, every 2 by 2 pixel region of the reconstructed image frame and its original counterpart is represented by a single $C_r$ and a single $C_b$ value (step 808). The representative values are obtained by averaging the values of each color component of the RGB data for the four pixels in a 2 by 2 region. The color difference values are found by the following equations:

$$C_r = 128 + 0.713(R-Y), \text{ and}$$

$$C_b = 128 + 0.564(B-Y).$$

The results generated by execution of the equations are bound to the range 0 to 255. To avoid penalizing fluctuations in the color information which would not be typically visible on some low end personal computers, whose display mechanism depends on a color palette, the averaged RGB color components used in the color difference determination equations are quantized values. The R and G components are each quantized into 8 shades in 8 bit resolution and the B component into 4 shades in 8 bit resolution. If the display mechanism to be used does not depend upon a color palette no quantifying step is used. The color fidelity equations executed in steps 810 and 812 are of the form:

$$F = [\Sigma 1/N(C^i(x,y) - C^d(x,y))^2]^{\frac{1}{2}}.$$

Where the summation is performed across all pixel locations (x,y). The quantitative fidelity of the image then may be obtained by summing the luminance fidelity measurement and the two color fidelity measurements (step 814).

$$F = F_y + F_r + F_b$$

Returning to FIG. 3, operation in the local assessment mode results in the no (N) path being taken from step 300 to step 304. The local assessment mode requires the logical linkage of segmented region in an original image with segmented regions in a reconstructed image. At step 304 a user is instructed to use a computer mouse or joystick to trace objects or local regions in the original image. At step 306 the user is instructed to trace corresponding objects in the reconstructed image. Next, with execution of step 308, the user is instructed to declare which pairs of objects or segments correspond. The computer may then perform one of a number of known edge detection algorithms in the vicinity of the traced borders of the segmented regions to adjust the borders and obtain more accurate image segmentation.

The automatic adjustment operation reduces the chance of incorporating unwanted features in one of the members of a given pair of segments while relieving the user of the tedium of accurately tracing objects. The edge adjustment operator selected is preferably highly accurate. It is recommended that the edge detection operator detect zero crossings of a second order differential operator. Within each corresponding pair, quantitative measurements of the differences between the segments may now be made on the basis of luminance, color, shape, texture and displacement.

The process continues with step 310 which controls looping of the process through scoring routines for the various properties. So long as a pair of corresponding segments exist, the no (N) branch is taken to step 312, which indicates retrieval of the next pair of corresponding segments (regions). Scoring is done within three subroutines including: (1) a shape and displacement scoring process (step 314); (2) a texture scoring process (step 316); and a luminance/color scoring process (step 318). Next, at step 320, the process generates an overall score for a segment pair. The process is then returned to step 310. Once all segment pairs have been evaluated, the yes (Y) branch is followed to step 322, which is executed to generate a weighted sum of the results from the assorted segment pairs. The weights for step 322 may be user selected, or may be based on objective criteria, such as displacement of the region from the center of the image or size of the segment.

Figure 4:
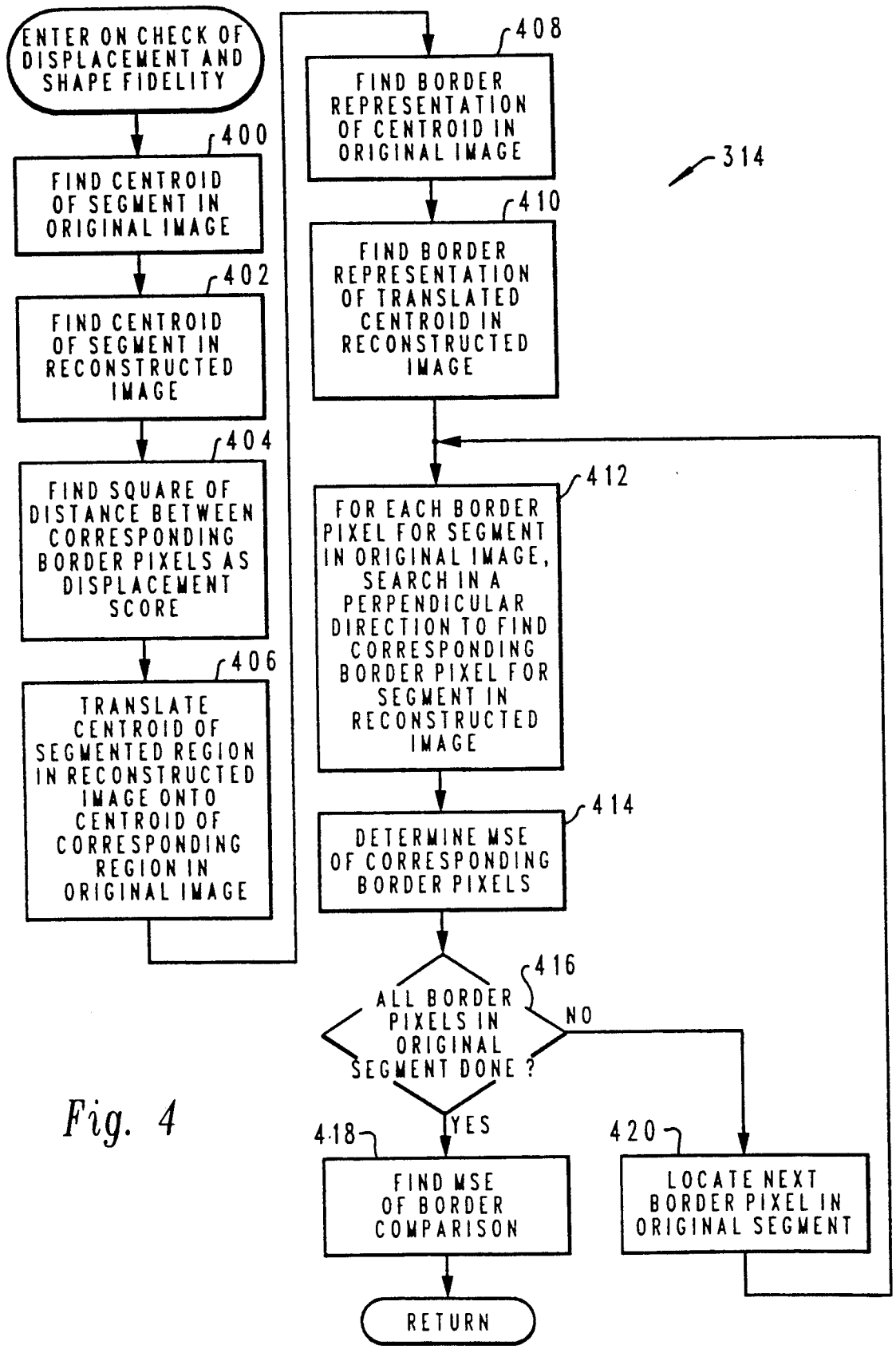
FIG. 4 is a flow chart of a process for scoring a segment in a reconstructed image for displacement and shape.

FIG. 4 illustrates assessment of displacement and shape fidelity in a reconstructed image. Of course, no displacement should occur and an object should retain its shape from original to reconstructed image frame. The fidelity measurements first find the centroids of the corresponding segments in the original image and in the reconstructed image (steps 400 and 402). Techniques for determining an object's centroid are known in the art. With execution of step 404, the process determines the distance between the centroids as a score for displacement fidelity (a score of zero being best). Because video image compression processes often employ motion estimation in the temporal domain, a displacement fidelity measurement is used for analysis of video.

Next, at step 406 the centroid of the segment in the reconstructed image is translated onto the position of the centroid of the corresponding segment in the original image to begin assessment of shape fidelity. The shape fidelity measurement of a segmented local region, whether textured, or nontextured, is obtained by computing the root mean square value of the distances between corresponding points on the boundary of the translated object in reconstructed image frame and the boundary of the object in the original frame. More elaborate measures are possible, but the RMS method is easily implemented and gives reasonably consistent results. To implement the operation, the border representations of the objects in the original and in the reconstructed image frames need to be found (steps 408 and 410). Next, at step 412, for each pixel in the border of an object or segment in the original image frame, a mapping is made to a pixel in the border of the segmented region in the reconstructed image frame. One way of doing this is to search in the directions perpendicular to the edge through the border pixel of the segmented region in the original image until a border pixel in the reconstructed object is encountered. Every border pixel in the original image segment will be mapped to a border pixel in the reconstructed image segment, although the opposite case is unlikely to be true. Some pixels in the border set for the reconstructed image may have no corresponding pixels in the original image, and some may have more than one.

With execution of step 414, the square of the distance between a corresponding pair is accumulated for the calculation of the mean square error between the borders. Step 416 is executed to determine when all pixels in the original segment border set have been processed. Until all such pixels have been processed, the no (N) branch from step 416 is taken through step 420 (retrieval of next pixel in original segment border) to step 412. Once all pixels in the border of the segmented region of the original image have been processed, the results of (step 414) are summed and the square root of the sum is obtained to generate a shape score (step 418). The process is then returned to step 314 in FIG. 3.

Figure 5:
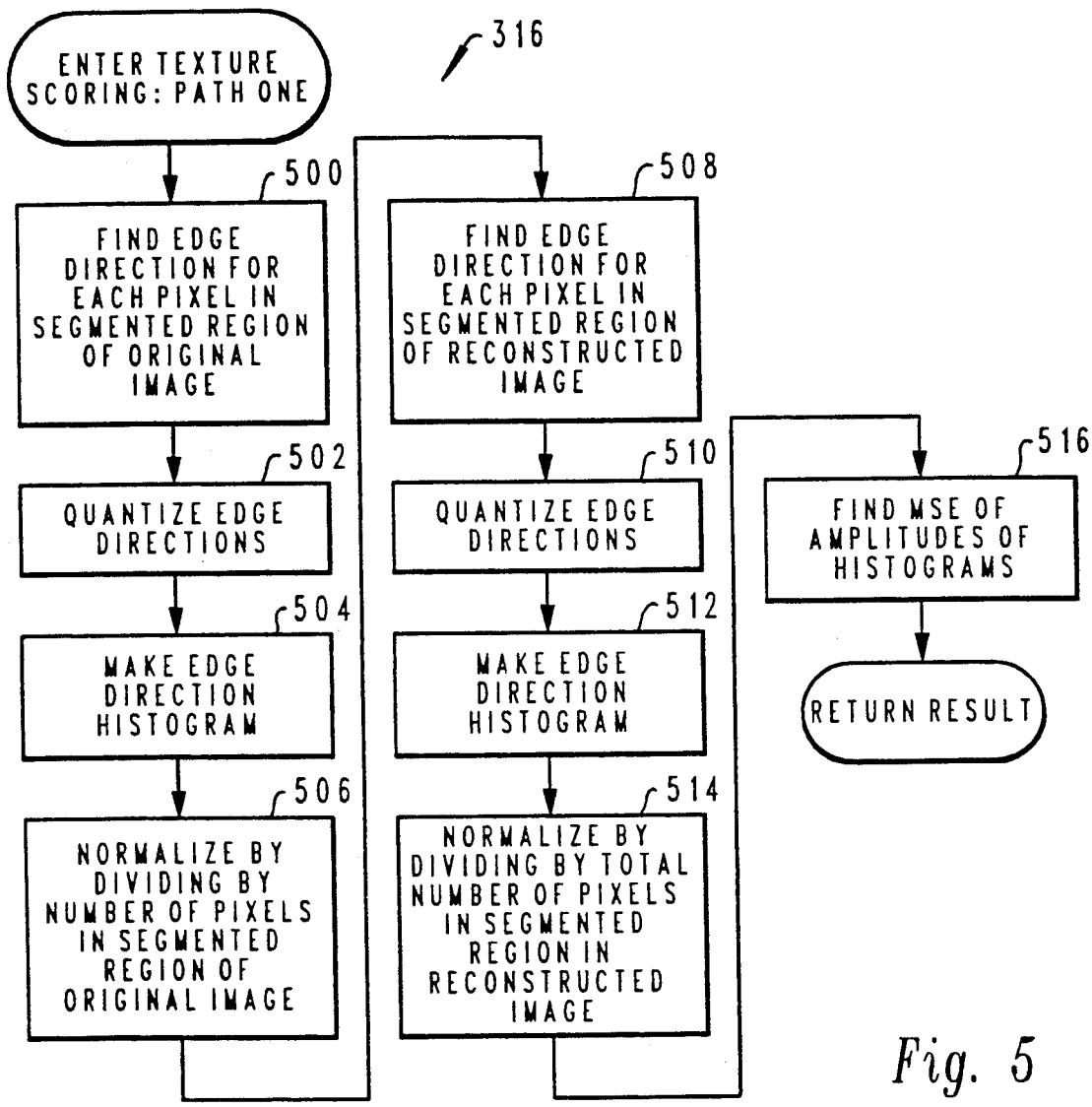
FIG. 5 is a flow chart of a process for scoring a segment for fidelity to texture.
Figure 7:
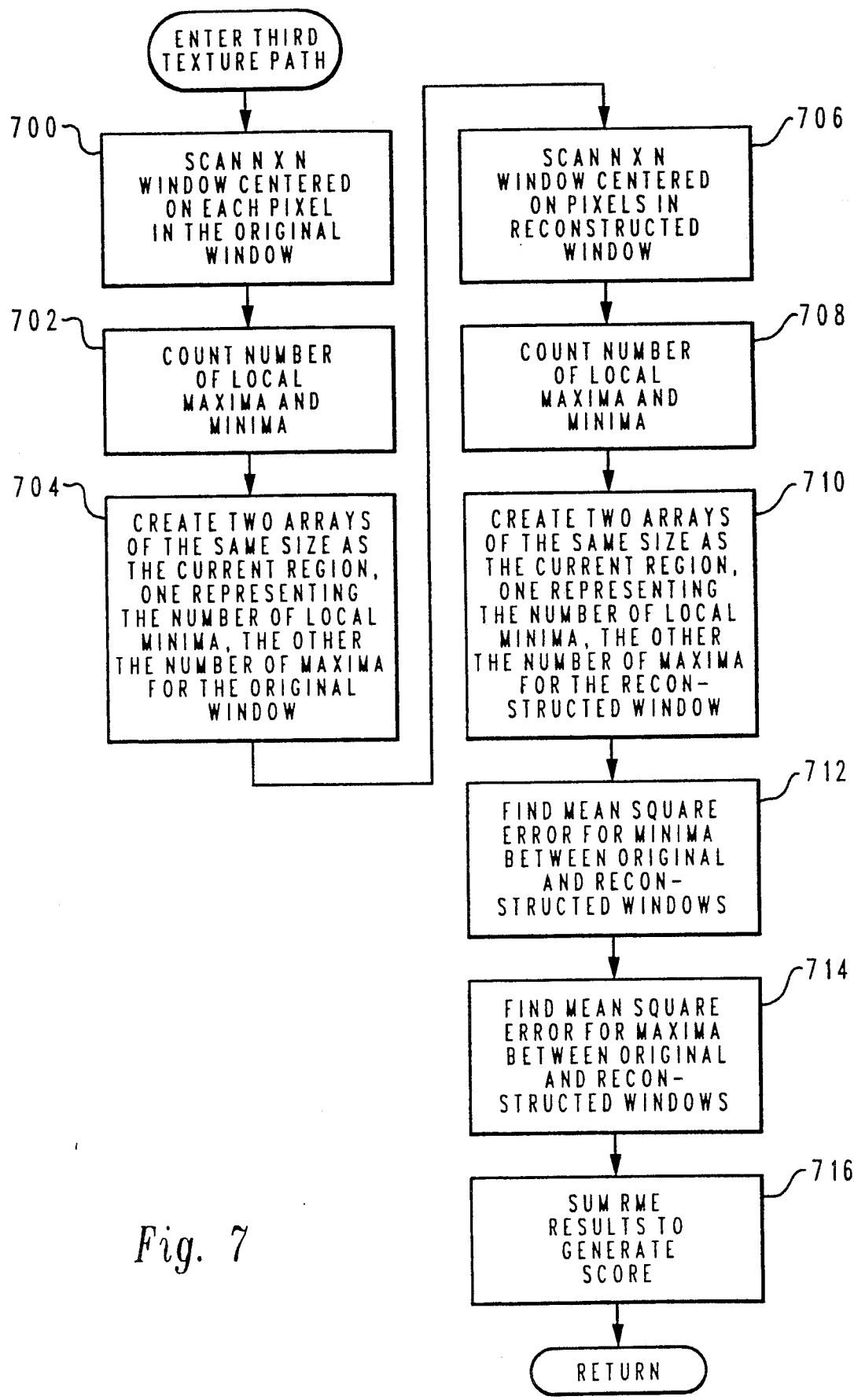
FIG. 7 is a flow chart of a process for scoring a segment for fidelity to texture.

FIGS. 5, 6, and 7 depict texture scoring processes, one or more of which may be selected for use by a user. The first texture assessment path is entered at step 500, where the edge orientation of each pixel in a segment in an original image frame is computed. With execution of step 502, the edge directions are quantized. Next, with step 504, a histogram of edge orientations is generated. At step 506 the histogram is normalized by the number of pixels in the region. Steps 508, 510, 512 and 514 provide the same operations with respect to the corresponding segment in the reconstruction image frame. Then, at step 516, the texture fidelity measurement is made by computing the root mean square value of the difference between the amplitudes of the normalized edge orienration histogram for the segment in the original image frame and the normalized edge of orientation histogram for the segment in the reconstructed image frame.

A process for carrying out the second texture fidelity measurement is illustrated in FIG. 6. At step 600 a bounding rectangle is fitted to the segment in the original image. Next, at step 602 a discrete cosine transform (DCT) is calculated over the bounded area (optionally a discrete Fourier transform may be used) to obtain the energy of the spatial frequencies of the segment. With steps 604 and 606 the same operations are performed with respect to a corresponding segment in the reconstructed image frame. A bounding rectangle is generated and a discrete cosine transform is calculated over the bounded area. In step 608 a fidelity measurement is obtained by computing the root mean square value of the difference between the amplitude of the coefficients of the discrete cosine transform of the segment in the reconstructed image frame and the coefficients of the discrete cosine transform of the segment in the original image frame. The difference between the coefficients are weighed prior to squaring in the means square error computation in such a way that the difference between coefficients for the high spatial frequencies are penalized less.

FIG. 7 illustrates a third texture fidelity assessment process. The process is entered at step 700 with a scan of n by n windows centered on each pixel of a segment in the original image frame, where n is an odd integer equal to or greater than 5. Next, in step 702, for each pixel location in a segment (or at which a window is centered), the number of local minima and local maxima in the window are counted. In step 704 two arrays of the same size as the segment in the original image frame are constructed and in one of the arrays the counts of local minima are deposited. In the second array the count of local maxima are deposited.

The process continues for the reconstructed image frame at step 706 with a scan of n by n windows centered on each pixel of the corresponding segment for the segment in the original image frame. The scan is performed over the corresponding segment in the reconstructed image, but only at those pixel locations that exist in the segmented region of the original image. Next, in step 708, for each pixel location in the segment, the number of local minima and a local maxima in the window are counted. In step 710 two arrays of the same size as the segment in the reconstructed image frame are constructed and in one the counts of local minima are deposited. In the second the count of local maxima are deposited.

In step 712 the mean square error between the minima arrays for the corresponding segments is calculated. In step 714 the root means square error between the maxima arrays for the corresponding segments is calculated. In step 716 the root means square error results are summed to generate a score for the segment in the reconstructed image frame.

It is expected that certain types of texture may require only a subset of the three texture assessment processes. When a user identifies a textured region, a sub-cesses may be presented to the user identifying known texture types (e.g. grass, brick, grain). By selection of a texture type, a selected subset of the texture assessment processes is applied to the region.

Textured regions are scored more loosely than non-textured regions for luminance and color fidelity. As illustrated in FIG. 8, following determination that a segment is textured, steps 816 and 818 are executed to find the average log transformed luminance values L(Y) over the corresponding segments in the original image frame and the reconstructed image frame, respectively. In step 820, the absolute difference between the average luminance values for the corresponding segments is calculated to provide a luminance fidelity score.

Color fidelity is measured in an analogous manner. With execution of step 822 the average first color difference values for the corresponding segments are found. In step 824 one value is substracted from the other and the absolute value is taken to provide a first color fidelity score. With execution of step 826 the average second color difference values for the corresponding segments are found. In step 828 one value is substracted from the other and the absolute value is taken to provide a second color fidelity score. All three scores are returned for summing with other scores for an overall segment fidelity measurement.

The overall fidelity measure of a region is obtained by a weighted averaging of the fidelity measures computed for the properties of that region. In computing the overall fidelity measure of an image, the overall fidelity measures of all the regions are averaged by weighing each region by two factors: size and location. The overall fidelity measure of a region whose area equals that of the image is weighted by 1.0. whereas a region of one pixel in size is weighted by 1/(area of the image). Since human perception tends to focus towards the center of images and video, the spatial location of each region with respect to the center of the image is considered when computing the overall image or video fidelity measure. The overall fidelity measure of an image region whose centroid is at the center of the image is weighted by a factor of 1.0. Assuming that the x and y dimensions of the image (or frame) are equal, the overall fidelity measure of an image region whose centroid is exactly at the image periphery is weighted by a factor of 0.5 (because it is half-image distance away from the center). The overall fidelity of a video clip is obtained by summing the overall fidelity measure of each frame in the clip. Optionally, the summed measure can be averaged by the number of frames in the video clip.

The present invention provides an objective tool for the evaluation of video and image compression processes. The compression attained in most compression processes can be varied by varying parameters in the compression process. The scoring method can be used to generate rate distortion curves, obtained by plotting the fidelity measurements of a region, an image, or video, as a function of the compression ratio. Rate distortion curves can also be plotted as a function of computational resources (e.g. storage, execution time). By selecting an appropriate set of images and an appropriate set of video clips that exhibit desired properties, compression processes can be compared by plotting the rate distortion curves with various levels of additive noise.

While the invention has been particularly shown and described with reference to a preferred embodiment, it will be understood by those skilled in the art that various changes in form and detail may be made therein without departing from the spirit and scope of the invention.

What is claimed is:

1. A method of quantitatively measuring fidelity of a reproduced image to an original image, the method comprising the steps of:
    capturing and digitizing the original image;
    compressing the original image into a compressed data representation;
    decompressing the compressed data representation to produce the reproduced image;
    responsive to user selection, establishing a global assessment mode or a local assessment mode;
    in the global assessment mode, determining luminance fidelity of the reproduced image to the original image and determining color fidelity over first and second color difference values of the reproduced image to the original image;
    in the local assessment mode and responsive to user selection, segmenting the reproduced image and the original image and establishing corresponding pairs of segments having one segment each from the reproduced image and the original image; and
    in the local assessment mode, scoring fidelity of segments of the reproduced image by comparing corresponding pairs of segments from the reproduced image and original image in color, luminance, shape and displacement.

2. A method of quantitatively measuring fidelity of a reproduced image reconstructed from a compressed data representation of an original image as set forth in claim 1, wherein the step in the local assessment mode of segmenting the reproduced image and the original image and establishing corresponding pairs of segments having one segment from the reproduced image and the original image further includes:
    prompting the user to select segments by drawing an enclosure around areas in the images; and
    executing an automatic edge detection process in a neighborhood around user drawn enclosures and setting the border of the selected segments equal to a detected edge.

3. A method of quantitatively measuring fidelity of a reproduced image reconstructed from a compressed data representation of an original image as set forth in claim 1, wherein the step in the local assessment mode of scoring fidelity of the reproduced image to the original image by corresponding pairs of segments further includes comparing texture of the segment from the reproduced image to a corresponding segment in the original image.

4. A method of quantitatively measuring fidelity of a reproduced image reconstructed from a compressed data representation of an original image as set in claim 3, and further comprising the steps of:
    responsive to user selection, characterizing the segments of a corresponding pair of segments as textured or nontextured.

5. A method of quantitatively measuring fidelity of a reproduced image reconstructed from a compressed data representation of an original image as set forth in claim 4, wherein the step in the local assessment mode of scoring fidelity of the reproduced image to the original image by comparing corresponding pairs of segments in color and luminance further includes:
    for a textured corresponding pair of segments, determining an average luminance difference between the segments and determining an average change in color for first and second color difference components;
    for a nontextured corresponding pair of segments, determining luminance change between a pair of segments by computing the root mean square value over the luminance changes between pixels in the respective segments; and
    for a nontextured corresponding pair of segments, determining color change between a pair of segments by filtering color difference values for subgroups of pixels within the segments and computing the root mean square value of the changes in the color difference values between filtered subgroups of pixels.

6. A method of quantitatively measuring fidelity of a reproduced image reconstructed from a compressed data representation of an original image, as set forth in claim 1, wherein in the global assessment mode the step of determining luminance fidelity of the reproduced image to the original image and determining color fidelity over first and second color difference values of the reproduced image to the original image includes:
    determining luminance change between the reproduced image and the original image by computing the root mean square value over the differences between pixels in the respective images; and
    determining color change between the reproduced image and the original image by filtering color difference values for subgroups of pixels in the images and computing the root mean square value of the changes in the color difference values by comparing filtered subgroups of pixels.

7. A method of quantitatively measuring fidelity of a reproduced image reconstructed from a compressed data representation of an original image as set forth in claim 5, wherein luminance is determined over a luminance range extending from minimum to maximum luminance intensity in the corresponding pair of segments and wherein the transformation is logarithmic of the form:

$$L(Y) = Y_{min} + [P(Y_{max} - Y_{min} + 1) - 1] \frac{\log(Y + 1) - \log(Y_{min} + 1)}{\log(Y_{max} + 1) - \log(Y_{min} + 1)}$$

where $[Y_{min}, Y_{max}]$ is the dynamic luminance scale of the data and where P gives L(Y) a resolution equal to a fraction of the original dynamic range and thus controls how luminance differences between the original image frame and the reconstructed frame are penalized.

8. method of quantitatively measuring fidelity of a reproduced image reconstructed from a compressed data representation of an original image as set forth in claim 6, wherein luminance is determined over a luminance range extending from minimum to maximum luminance intensity in the reproduced and original images and wherein the transformation is logarithmic of the form:

$$L(Y) = Y_{min} + [P(Y_{max} - Y_{min} + 1) - 1] \frac{\log(Y + 1) - \log(Y_{min} + 1)}{\log(Y_{max} + 1) - \log(Y_{min} + 1)}$$

where $[Y_{min}, Y_{max}]$ is the dynamic luminance scale of the data and where P gives L(Y) a resolution equal to a fraction of the original dynamic range and thus control how luminance differences between the original image frame and the reconstructed frame are penalized.

9. A method of quantitatively measuring fidelity of a reproduced image reconstructed from a compressed data representation of an original image as set forth in claim 7 and further including:
   generating distortion curves based on fidelity scores.

10. Apparatus for quantitatively measuring fidelity of a reproduced image with an original image, comprising:
   means for capturing and digitizing the original image;
   means for compressing the original image into a compressed data representation;
   means for decompressing the compressed data representation to produce the reproduced image;
   means for determining luminance fidelity of the reproduced image to the original image and for determining color fidelity from changes in first and second color difference values in the reproduced image from the original image;
   means responsive to user selection for segmenting the reproduced image and the original image and establishing corresponding pairs of segments having one segment each from the reproduced image and the original image; and
   means for scoring fidelity of the reproduced image to the original image by comparing corresponding pairs of segments in color, luminance, shape and displacement of a segment from the reproduced image compared to a corresponding segment in the original image to score the segments in the reproduced image.

11. Apparatus for quantitatively measuring fidelity of a reproduced image reconstructed from a compressed data representation of an original image as set forth in claim 10, wherein the means for segmenting the reproduced image and the original image and for establishing corresponding pairs of segments having one segment from the reproduced image and from the original image further include:
   means for prompting the user to select segments by drawing an enclosure around the segments; and
   means for automatically detecting and edge in a neighborhood around user drawn enclosure and setting the border of a selected segment equal to a detected edge.

12. Apparatus for quantitatively measuring fidelity of a reproduced image reconstructed from a compressed data representation of an original image as set forth in claim 10, wherein means for scoring fidelity of the reproduced image to the original image by corresponding pairs of segments further include means for comparing texture of the segment from the reproduced image to a corresponding segment in the original image.

13. Apparatus for quantitatively measuring fidelity of a reproduced image reconstructed from a compressed data representation of an original image as set in claim 12, and further comprising:
   means responsive to user selection for identifying the segments of a corresponding pair of segments as textured or nontextured.

14. Apparatus for quantitatively measuring fidelity of a reproduced image reconstructed from a compressed data representation of an original image as set forth in claim 13, wherein the means for scoring fidelity of the reproduced image to the original image by comparing corresponding pairs of segments in color and by luminance further includes:
   means for determining for a textured corresponding pair of segments an average luminance difference between the segments and for determining an average change in color for first and second color difference components;
   means for determining for a nontextured corresponding pair of segments luminance change between a pair of segments by computing the root mean square value over the luminance changes between pixels in the respective segments; and
   means for determining for a nontextured corresponding pair of segments color change between a pair of segments by filtering color difference values for subgroups of pixels within the segments and for computing the root means square value of the changes in the color difference values between filtered subgroups of pixels.

15. Apparatus for quantitatively measuring fidelity of a reproduced image reconstructed from a compressed data representation of an original image, as set forth in claim 10, wherein the means for determining luminance fidelity of the reproduced image to the original image and the means for determining color fidelity over first and second color difference values of the reproduced image to the original image include:
   means for finding luminance change between the reproduced image and the original image by computing the root means square value over the differences between pixels in the respective images; and
   means for finding color change between the reproduced image and the original image by filtering color difference values for subgroups of pixels in the image and for computing the root means square value of the changes in the color difference values by comparing filtered subgroups of pixels.

16. Apparatus for quantitatively measuring fidelity of a reproduced image reconstructed from a compressed data representation of an original image as set forth in claim 14, wherein luminance is determined over a luminance range extending from minimum to maximum luminance intensity in the corresponding pair of segments and wherein the transformation is logarithmic of the form:

$$L(Y) = Y_{min} + [P(Y_{max} - Y_{min} + 1) - 1] \frac{\log(Y + 1) - \log(Y_{min} + 1)}{\log(Y_{max} + 1) - \log(Y_{min} + 1)}$$

where $[Y_{min}, Y_{max}]$ is the dynamic luminance scale of the data and where P gives L(Y) a resolution equal to a fraction of the original dynamic range and thus controls how luminance differences between the original image frame and the reconstructed frame are penalized.

17. Apparatus for quantitatively measuring fidelity of a reproduced image reconstructed from a compressed data representation of an original image as set forth in claim 15, wherein luminance is determined over a luminance range extending from minimum to maximum luminance intensity in the reproduced and original images and wherein the transformation is logarithmic of the form:

$$L(Y) = Y_{min} + [P(Y_{max} - Y_{min} + 1) - 1] \frac{\log(Y + 1) - \log(Y_{min} + 1)}{\log(Y_{max} + 1) - \log(Y_{min} + 1)}$$

where $[Y_{min}, Y_{max}]$ is the dynamic luminance scale of the data and where P gives L(Y) a resolution equal to a fraction of the original dynamic range and thus controls how luminance differences between the original image frame and the reconstructed frame are penalized.

18. Apparatus for quantitatively measuring fidelity of a reproduced image reconstructed from a compressed data representation of an original image as set forth in claim 16 and further including:
   means for generating distortion curves based on fidelity scores.

19. A method as set forth in claim 1, and further comprising the steps of:
   in the local assessment mode, weighing fidelity scoring for the segments by location in the reproduced image; and
   summing the weighted scores to generate an overall fidelity score.

20. Apparatus as set forth in claim 10, and further comprising:
   means for weighing fidelity scores for segments by location in the reproduced image; and
   means for summing the weighted fidelity scores.

* * * * *